United States Patent Office 2,810,764
Patented Oct. 22, 1957

2,810,764

HYDRATION OF ACETYLENE AND CATALYST THEREFOR

Thomas R. Steadman, Waban, and James F. Gabbett, Jr., Allston, Mass., assignors, by mesne assignments, to Escambia Chemical Corporation, Pace, Fla., a corporation of Delaware No Drawing. Application April 6, 1953, Serial No. 347,153

6 Claims. (Cl. 260—605)

This invention relates to the hydration of acetylenes and more particularly to the vapor phase hydration of a dilute acetylene stream to produce acetaldehyde.

The vapor phase hydration of acetylene is not new. However, the prior art has long been directed to a search for improved catalytic hydration processes to provide greater conversion of the acetylene with long catalyst life and low catalyst cost. Ease of regeneration of the catalyst is also of prime importance from an economic standpoint. Where acetaldehyde is the desired end product, it is of prime importance that the product acetaldehyde contain essentially no crotonaldehyde. Additionally, it is desirable to hydrate the acetylene content in a dilute stream of acetylene so as to obviate the necessity for providing expensive concentration equipment prior to the hydration equipment.

Numerous catalysts have been proposed in the prior art for hydrating acetylene to acetaldehyde. Many of these catalysts have been based on the use of phosphoric acid. Examples of such catalysts are those described in U. S. Patents 2,569,092 to Deering, 2,098,842 to Walter, 2,206,227 to Groombridge et al., and 2,253,034 to Ipatieff et al. None of these catalysts has been found to be completely satisfactory from the standpoint of all of the requisites of high conversion, selectivity, cheapness, and ease of regeneration.

Accordingly, it is a principal object of the present invention to provide an improved process and catalyst for the vapor phase hydration of acetylene to produce high conversions to acetaldehyde at a low cost.

Another object of the invention is to provide a process of the above type which is particularly adapted to the hydration of an acetylene stream where the acetylene is only a minor percentage of the total gases in the stream.

Still another object of the invention is to provide a process of the above type which will give a high yield of acetaldehyde with essentially no crotonaldehyde, the process employing a novel catalyst which has a low initial cost and which may be readily regenerated upon fouling.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

The present invention is directed primarily to the production of acetaldehyde by the vapor phase hydration of a dilute acetylene stream. Such dilute acetylene streams may be obtained from a number of well-known processes such as the arc process, the Sachsse process, and the Wulff process. These dilute acetylene streams normally contain about 8 to 14 percent by volume of acetylene, the remainder of the stream consisting of normally gaseous products such as methane, carbon monoxide, carbon dioxide, hydrogen, etc. These gaseous products are relatively unaffected by the hydration reaction. However, such dilute acetylene streams often contain appreciable quantities of higher acetylenes which are quite reactive and tend to foul the catalyst by polymerization thereon. Additionally, the hydration reaction tends to foul the catalyst by producing some carbon and other solid deposits on the catalyst which must be periodically removed at low cost. In the present invention the hydration catalyst is one which can be readily regenerated by burning off the contaminating solids. The catalyst is preferably a cadmium silicate which has been treated with phosphoric acid. Its chemical constitution is such that it is inert to oxygen at catalyst-regeneration temperatures. This silicate contains about 0.01% to 0.2% by weight of copper ion, and preferably contains about 15% to 25% by weight of phosphate ion. Alternatively, the catalyst may be a zinc silicate containing 0.01 to 0.2% by weight of copper ion treated with phosphoric acid so as to contain 15%–25% of phosphate ion.

In one preferred embodiment of this invention, this catalyst is prepared in accordance with the following non-limiting examples (all space velocities measured at the reaction temperatures specified and at atmospheric pressure):

*Example I*

Approximately 750 milliliters of a solution containing 150 grams of cadmium nitrate ($Cd(NO_3)_2.4H_2O$) and 0.75 gram of copper nitrate ($Cu(NO_3)_2.3H_2O$) were added slowly from a separatory funnel (about 30 minutes required) to a vigorously stirred solution of 375 grams of water glass diluted to 1500 milliliters at 25° C. When 700 milliliters of the solution of nitrates had been added, the pH of the mixture was carefully followed and the addition of the nitrates stopped at a pH of 7.0±0.1. The thick precipitate was digested on a steam bath for twenty-four hours and filtered. The wet, pastic filter cake was pressed through a 4 mesh screen, and the extrusions dried in a hot air oven for four hours. The resulting granules were screened through a 20 mesh sieve to remove "fines" and 250 milliliters (112 grams) of the retained material immersed in 32.5 grams of 86.1% phosphoric acid diluted with water to 300 milliliters. The mixture was evaporated to dryness on a steam bath (about sixteen hours required). The granules were screened again through a 20 mesh sieve and the retained granules were placed in a tubular reactor which was then heated to a temperature of about 440° C. Through this catalyst bed was passed a gas stream containing about 8% by volume of acetylene. Operating with a space velocity of 2250 hr.$^{-1}$ and a water-to-acetylene mole ratio of 13.4 to 1, 80.4% of the acetylene in the dilute stream was converted to acetaldehyde over this catalyst. Essentially no crotonaldehyde was present in the product of this hydration reaction.

In still other embodiments of the invention, the catalyst and its use are set forth in the following nonlimiting examples:

*Example II*

In a 6 liter stainless steel beaker was placed a solution of 200 grams of zinc nitrate ($Zn(NO_3)_2 16H_2O$) in 1000 milliliters of water. This was mixed with a solution of 1.7 grams of copper nitrate ($Cu(NO_3)_2.3H_2O$) in 800 milliliters of water; and 860 milliliters of this mixture poured slowly with good stirring into a solution of 200 milliliters of water glass in 1800 milliliters of water. The final pH of the reaction mixture was 7.0. The voluminous pale blue precipitate was filtered on a Büchner funnel and the filter cake washed thoroughly with water. The wet, plastic filter cake was made into pellets by extrusion through a 4 mesh screen, dried in a hot air oven and the resulting blue granules shaken on a 10 mesh screen to remove the "fines." The granules were covered with a solution of 19.4 grams of 85% phosphoric acid in 150 milliliters of water. The mixture was placed in an evaporating dish on a steam bath and evaporated to dryness. The resulting catalyst was placed in a tubular reactor which was then heated to a temperature of about 410° C. Through this catalyst was passed a gas stream containing about 8% by volume of acetylene, operating with a space velocity of 2420 hours$^{-1}$ and a water-to-acetylene mole ratio of 12.8 to 1; 41.8% of the acetylene in the dilute stream was converted to acetaldehyde over this catalyst. Essentially no crotonaldehyde was present in the product of this hydration reaction.

*Example III*

To a solution of 555 grams of cadmium nitrate $(Cd(NO_3)_2.4H_2O)$ in one liter of water was added 1.27 grams of copper nitrate $(Cu(NO_3)_2 3H_2O)$. This solution (at 25° C.) was added slowly (over a period of 30 minutes) to a well-stirred solution of 512 grams of sodium metasilicate $(Na_2SiO_3.9H_2O)$ dissolved in two liters of water. The resulting suspension (pH=7.0±0.1) was digested on a steam bath for four hours, filtered, and the filter cake washed well with water. The plastic filter cake was pressed through a 4 mesh screen, and the extrusions dried for 48 hours at 80° C. The dry granules were heated for two hours at 900° C. to remove any excess nitrate ion and then cooled to 25° C. Three hundred (300) grams of these granules were immersed in 400 milliliters of dilute phosphoric acid (prepared from 91 grams of 85% phosphoric acid), and the mixture evaporated to dryness on a steam bath. The dried granules were capable of converting 74% of the acetylene in the dilute stream (8% acetylene) to acetaldehyde, operating at a space velocity of 2370 hr.$^{-1}$ at 440° C., with a water-to-acetylene ratio of 15.2 to 1.

While preferred examples have been given above, numerous changes can be made in these specific examples. For instance, other water soluble silicates such as potassium silicate may also be used in place of the water glass or sodium metasilicate.

With regard to the concentration of the phosphate ion (which is approximately 20% by weight in the examples given), good results have been obtained in the range between 15% to 25% by weight. The weight percentage of copper ion is also subject to considerable variation when using cadmium silicate catalysts. Concentrations of copper ion less than about .01% result in lower activity (on the order of 50% conversion) while concentrations above about 0.2% of copper ion have been found to result in rather rapid loss of activity with use, requiring unduly frequent regeneration.

The ratio of steam to acetylene, the temperature of the reaction zone, and the space velocity are also subject to considerable latitudes of operation. It has been found that the ratio of steam to acetylene, on a molal basis, can be varied between about 5 to 1 and 15 to 1. The temperature range of the reactor can vary between about 250° C. as a lower limit, with about 440° C. as an upper limit. This upper limit is largely determined by the decomposition temperature of the acetaldehyde. The space velocity is largely determined by economic considerations. When the space velocity is much less than about 1500 hours$^{-1}$, the equipment size becomes unduly large. When the space velocities are greater than about 3500 hours$^{-1}$, the acetaldehyde yield begins to fall off and the smaller investment in capital equipment is outweighed by lower yields of acetaldehyde and recycling problems.

This application is a continuation-in-part of our co-pending application Serial No. 287,422, filed May 12, 1952, now abandoned.

Since certain changes may be made in the above process without departing from the scope of the invention herein involved, it is intended that all matter contained in the above description shall be interpreted as illustrative and not in a limiting sense.

What is claimed is:

1. The process for producing acetaldehyde which comprises passing acetylene and steam over a catalyst maintained at a temperature between about 300° C. and 440° C., said catalyst consisting essentially of cadmium silicate containing between about 15% and 25% by weight of combined phosphate and about 0.01% to 0.2% by weight of combined copper.

2. The process for producing acetaldehyde which comprises passing acetylene and steam over a catalyst maintained at a temperature between about 300° C. and 440° C., said catalyst consisting essentially of a metal silicate selected from the class consisting of cadmium silicate and zinc silicate with from about 15% to 25% by weight of combined phosphate and from about 0.01% to 0.2% by weight of combined copper.

3. The process for producing acetaldehyde which comprises passing a dilute acetylene stream and steam over a catalyst maintained at a temperature between about 300° C. and 440° C., said catalyst consisting essentially of a metal silicate selected from the group consisting of cadmium silicate and zinc silicate with from about 15% to 25% by weight of combined phosphate and from about 0.01% to 0.2% by weight of combined copper, the mole ratio of water to acetylene being between about 10 to 1 and 15 to 1.

4. The process of claim 3 wherein said dilute acetylene stream contains less than about 14% by volume of acetylene.

5. A catalyst for producing acetaldehyde with a high degree of conversion of acetylene to acetaldehyde and a low degree of production of crotonaldehyde, said catalyst consisting essentially of a metal silicate selected from the class consisting of cadmium silicate and zinc silicate with from about 15% to 25% by weight of combined phosphate and from about 0.01 to 0.2% by weight of combined copper.

6. The catalyst of claim 5 wherein said catalyst contains about 20% by weight of combined phosphate and about 0.1% by weight of combined copper.

References Cited in the file of this patent

UNITED STATES PATENTS

| 2,098,842 | Walter | Nov. 9, 1937 |
|---|---|---|
| 2,212,593 | Dittrich | Aug. 27, 1940 |
| 2,288,335 | Walter et al. | June 30, 1942 |
| 2,402,958 | Globus | July 2, 1946 |
| 2,569,092 | Deering | Sept. 25, 1951 |
| 2,642,402 | Corner et al. | June 16, 1953 |